United States Patent
Ma et al.

(10) Patent No.: US 6,849,019 B2
(45) Date of Patent: Feb. 1, 2005

(54) TRANSMISSION MECHANISM FOR DRIVING FOUR WHEELS

(75) Inventors: Weijin Ma, Xingjiang (CN); Mingxue Yang, Xinjiang (CN); Yujiang Wang, Xinjiang (CN); Yingpu Wang, Xinjiang (CN); Bin Liang, Xinjiang (CN); Yongge Fan, Xinjiang (CN); Wenbin Pan, Xinjiang (CN); Feng Gao, Beijing (CN)

(73) Assignee: Xinjiang Shengsheng Co., Ltd. (CN)

( * ) Notice: Subject to any disclaimer, the term of this patent is extended or adjusted under 35 U.S.C. 154(b) by 0 days.

(21) Appl. No.: 10/661,468

(22) Filed: Sep. 11, 2003

(65) Prior Publication Data

US 2004/0124025 A1 Jul. 1, 2004

(30) Foreign Application Priority Data

Sep. 12, 2002 (CN) ........................................ 02253905 U

(51) Int. Cl.[7] ............................................. F16H 37/08
(52) U.S. Cl. ........................ 475/201; 475/203; 475/206
(58) Field of Search ................................. 475/198, 201, 475/203, 206; 180/248

(56) References Cited

U.S. PATENT DOCUMENTS

| 2,158,320 | A | * | 5/1939 | Bock | 475/201 |
| 6,001,043 | A | * | 12/1999 | Yun | 475/206 X |
| 6,514,167 | B1 | * | 2/2003 | Fleytman et al. | 475/201 |

FOREIGN PATENT DOCUMENTS

| JP | 01-320354 | * | 12/1989 | ................. 475/206 |
| JP | 05-254356 | * | 10/1993 | ................. 180/248 |

* cited by examiner

*Primary Examiner*—Ha Ho
(74) *Attorney, Agent, or Firm*—Sheridan Ross P.C.

(57) ABSTRACT

A transmission mechanism with a differential mechanism is provided for an automotive vehicle to drive four wheels instead of those with two differential mechanisms disposed on the front axle and rear axle in the prior art. The transmission mechanism is of a compact structure and a relatively less cost of manufacturing, and makes a clearance between the chassis of the automotive vehicle and the ground increased. The performance of the automotive vehicle equipped with the transmission mechanism can be improved.

17 Claims, 3 Drawing Sheets

TRANSMISSION MECHANISM FOR DRIVING FOUR WHEELS

BACKGROUND OF THE INVENTION

1. Field of the Invention

The present invention relates to a transmission mechanism of automotive vehicles, and more particularly to a transmission mechanism for driving four wheels.

2. Description of the Related Art

Many transmission mechanisms with a differential gear lock limiting mechanism have been used in automotive vehicles. Because when an automotive vehicle encounters weaker roads, such as loose soil, foothill and the like, two wheels of the automotive vehicle at the same side may lose adhesions to the ground, which will cause the wheels skidding. The differential gear lock limiting mechanism can limit different rotating speeds of the two wheels up to locking the differential gear of the automotive vehicle. In this case, however, the driving side shafts of the two sides will be integrated, and the automotive vehicle can only be driven in line. Moreover, the differential gear lock limiting mechanism used in the art is complicated, expensive and difficult to maintain.

Hence, a transmission mechanism that overcomes the above-mentioned problems is desired.

SUMMARY OF THE INVENTION

Accordingly, an object of the present invention is to provide a transmission mechanism that overcomes the shortcomings in the prior art.

In order to achieve the above-mentioned object, a transmission mechanism for driving four wheels of an automotive vehicle in accordance with the present invention comprises a drive housing having a first bearing bracket disposed at the middle portion thereof, a second bearing bracket disposed at the middle portion thereof, a third bearing bracket disposed at the left upper portion thereof, a fourth bearing bracket disposed at the right upper portion thereof, a fifth bearing bracket disposed below the first bearing bracket, and a sixth bearing bracket disposed at the lower portion thereof; a differential mechanism including a right side bevel gear, a left side bevel gear, and a ring gear; a driving power input shaft mounted within the first bearing bracket; a first dual tandem gear slidably mounted on the driving power input shaft; a core shaft mounted within the second bearing bracket, on which the differential mechanism is mounted; a sixth gear connected with the core shaft; a seventh gear connected with the core shaft; a rear right wheel output shaft mounted within the third bearing bracket; an eighth gear fixed to the rear right wheel output shaft; a rear left wheel output shaft mounted within the fourth bearing bracket; a ninth gear fixed to the rear left wheel output shaft; a middle shaft mounted within the fifth bearing bracket; a left gear mounted on the middle shaft close to the fifth bearing bracket; a right gear mounted on the middle shaft to mesh with the ring gear; a middle gear mounted on the middle shaft between the left and the right gear; a front right wheel output shaft mounted within the sixth bearing bracket; a clutch gear mounted on the front right wheel output shaft; a tenth gear mounted on the front right wheel output shaft; and a front left wheel output shaft connected with the tenth gear, into which the front right wheel output shaft is extended. When the driving power input shaft is driven, the first dual tandem gear can be regulated to mesh with either the left gear or the middle gear so that the automotive vehicle can obtain different speeds, and wheels at the same side of the automotive vehicle can be driven at the same time.

In one embodiment of the present invention, the tenth gear is fixed to a shaft sleeve that is mounted on the front right wheel output shaft, and a slidable engaging member is provided to connect the front left wheel output shaft with the shaft sleeve.

In another embodiment carrying out the present invention, a fork sleeve is provided be slidably mounted on the front right wheel output shaft and provides an inner gear to mesh with the clutch gear.

In still another embodiment of the invention, the ring gear is fixed to a first shaft sleeve extended from the differential case, and the seventh gear is splined to a second shaft sleeve extended from the right side bevel gear.

In the present invention, the first dual tandem gear may be splined to the driving power input shaft, and each of the first dual tandem gear and the slidable engaging member provides a recess at the outer surface thereof for connecting a fork for the control.

Compared to the prior art, a single differential mechanism is used in the transmission mechanism of the present invention to drive four wheels. Therefore, the transmission mechanism is of a compact structure and a relatively less cost of manufacturing, and makes a clearance between the chassis of the automotive vehicle and the ground increased. As a result, the performance of the automotive vehicle is improved and the automotive vehicle can be steered smoothly. Furthermore, the single differential mechanism of the invention may generate different speeds between the left side wheels and the right side wheels, and can obtain the same performance as those with two differential mechanisms in the prior art.

Other objects, features and advantages of the present invention will become apparent from the following detailed description in conjunction with the accompanying drawings.

DETAILED DESCRIPTION OF PREFERRED EMBODIMENTS OF THE INVENTION

Figure 1:
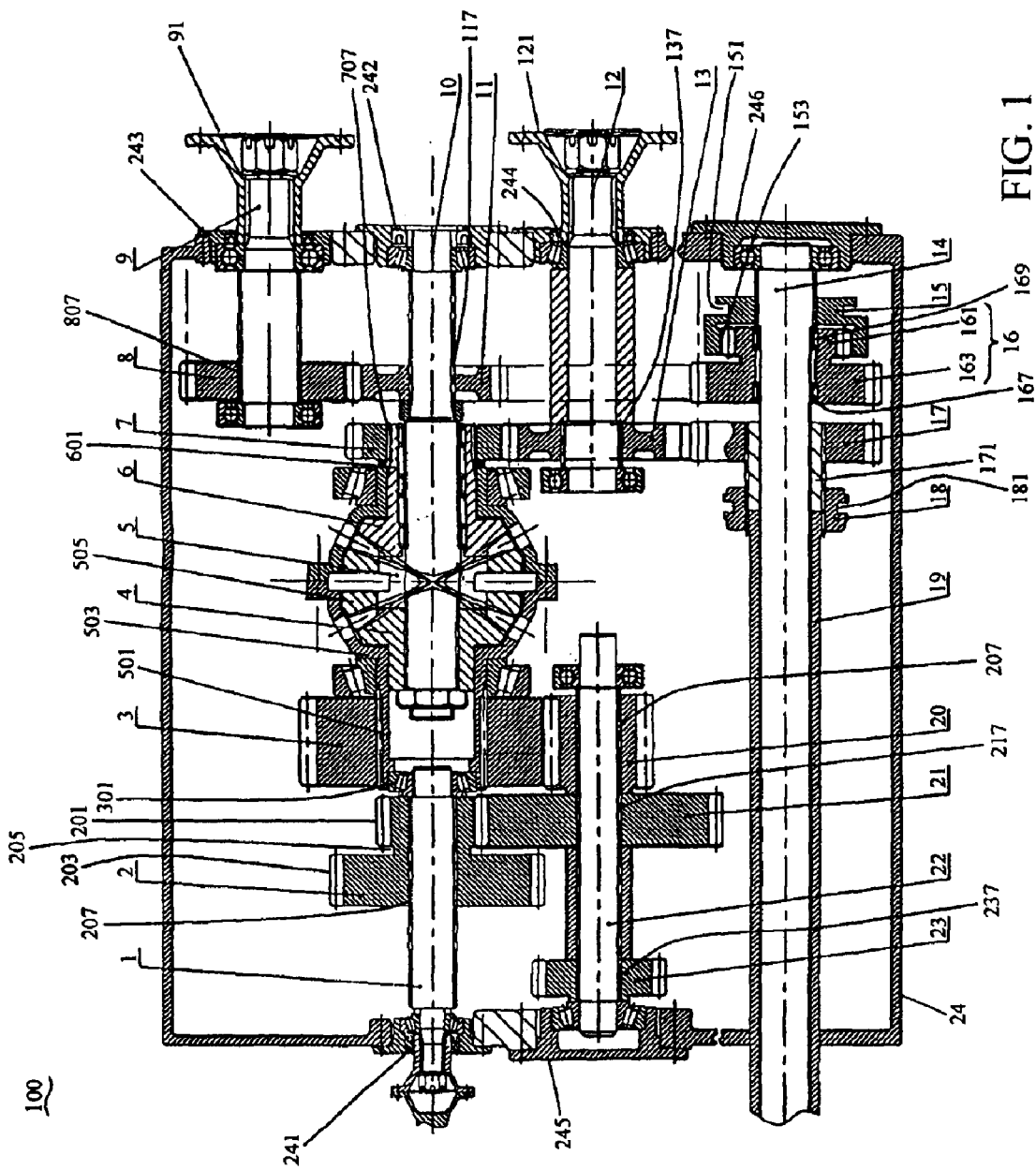
FIG. 1 is a schematic plan view of a transmission mechanism in accordance with the present invention.
Figure 2:
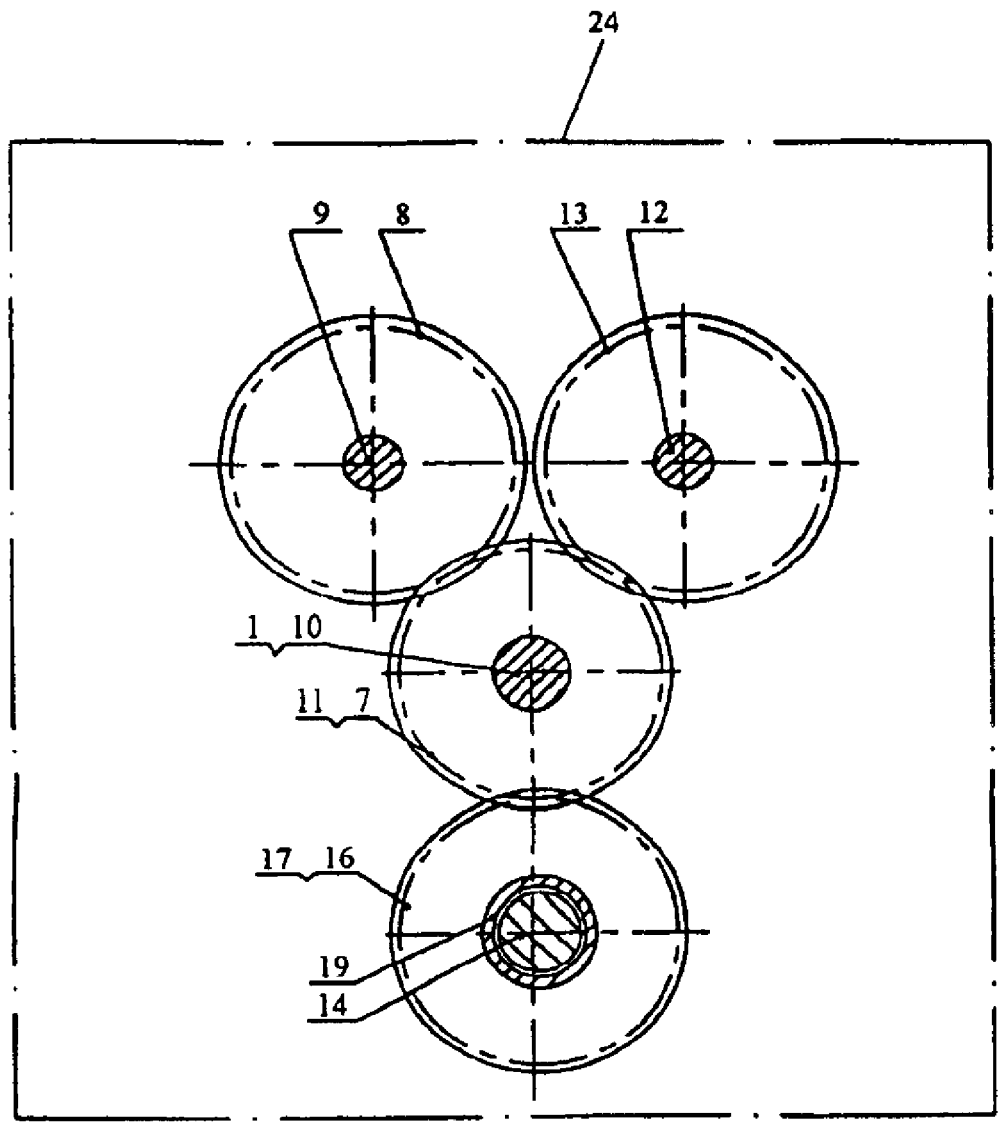
FIG. 2 is a schematic and sketching side view showing the location of shafts of the transmission mechanism as shown in FIG. 1.
Figure 3:
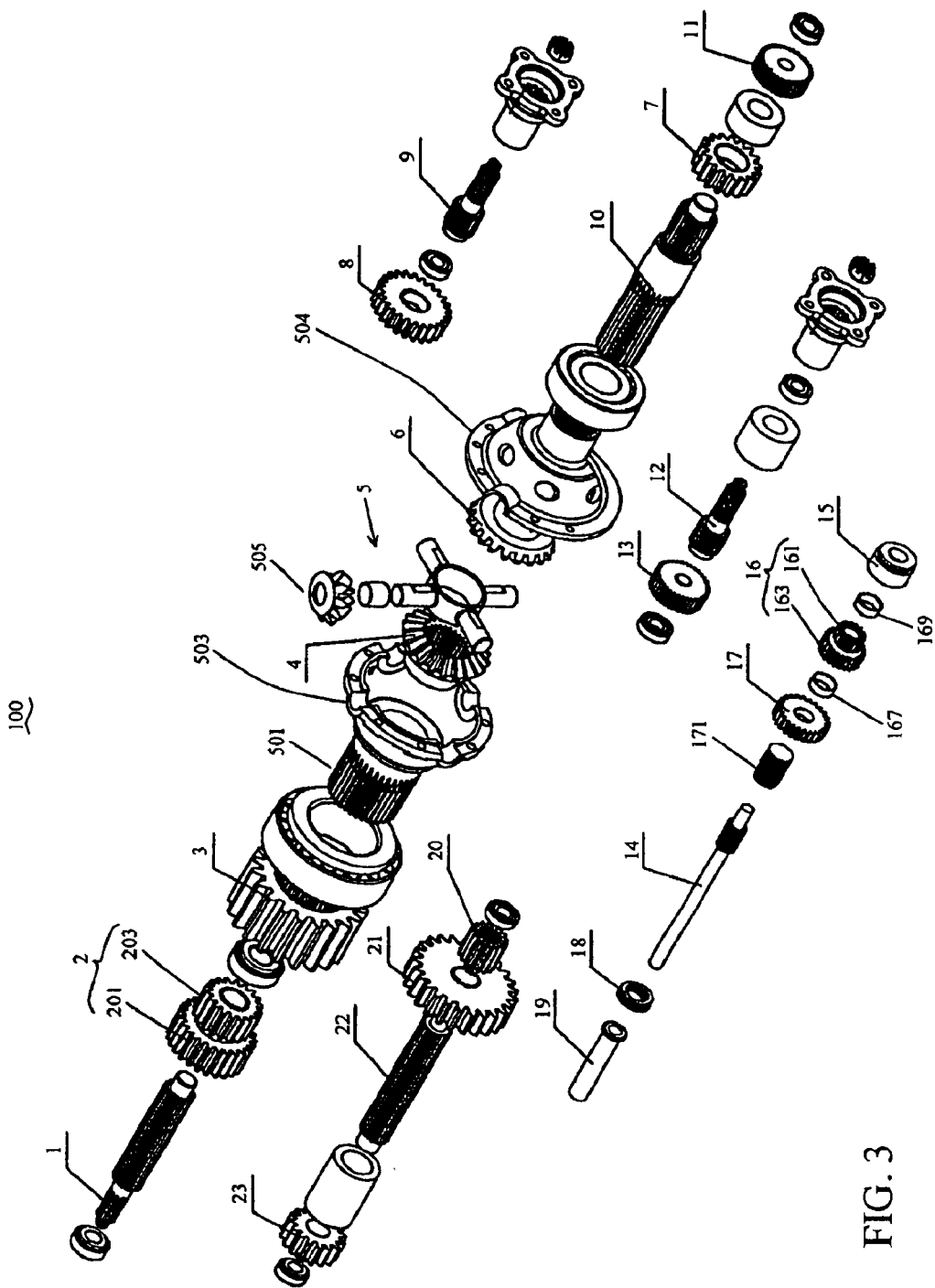
FIG. 3 is a schematically exploded view of a transmission mechanism in accordance with the present invention as shown in FIG. 1.

The present invention will be further described below with reference to the drawings. Referring to FIGS. 1 to 3, a transmission mechanism 100 of an automotive vehicle for driving four wheels in accordance with the present invention comprises a drive housing 24, a driving power input shaft 1, a core shaft 10, a rear right wheel output shaft 9, a rear left wheel output shaft 12, a middle shaft 22, a front right wheel output shaft 14, a front left wheel output shaft 19, and a differential mechanism 5 mounted at the middle portion of the drive housing 24. The differential mechanism 5 includes a right side bevel gear 6, a left side bevel gear 4, a ring gear 3, a differential case 503 and planetary gears 505. The drive housing 24 has a first bearing bracket 241 disposed at the middle portion thereof, a second bearing bracket 242 disposed at the middle portion thereof, a third bearing bracket 243 disposed at the left upper portion thereof, a fourth bearing bracket 244 disposed at the right upper portion thereof, a fifth bearing bracket 245 disposed below the first bearing bracket 241, and a sixth bearing bracket 246 disposed at the lower portion thereof.

The driving power input shaft 1 is connected with an engine (not shown) of the automotive vehicle, and mounted within the first bearing bracket 241 and a seventh bearing bracket 301 which is disposed within a first shaft sleeve 501 extended from the differential case 503. A first dual tandem gear 2 having a first larger gear 203 and a first smaller gear 201 is slindably mounted on the input shaft 1 via a first spline 207.

Elements of the differential mechanism 5 used in this invention are the same as those in the prior art except those specifically described herein. The core shaft 10 is mounted within the second bearing bracket 242 and coaxial with the driving power input shaft 1. The right side bevel gear 6 and the left side bevel gear 4 are mounted on the core shaft 10, and both of them can mesh with the planetary gears 505. A sixth gear 11 is mounded to the core shaft 10 via a second spline 117. A seventh gear 7 is mounded to a second shaft sleeve 601 extended from the right side bevel gear 6 via a third spline 707.

The rear right wheel output shaft 9 is connected with a rear right wheel (not shown) of the automotive vehicle via a first connecting member 91 and is mounted within the third bearing bracket 243. An eighth gear 8 is mounded on the rear right wheel output shaft 9 via a fourth spline 807 to mesh with the sixth gear 11.

The rear left wheel output shaft 12 is connected with a rear left wheel (not shown) of the automotive vehicle via a second connecting member 121 and mounted within the fourth bearing bracket 244. A ninth gear 13 is mounted on the rear left wheel output shaft 12 via a fifth spline 137 to mesh with the seventh gear 7.

The middle shaft 22 is mounted within the fifth bearing bracket 245. A left gear 23 and a middle gear 21 are mounted on the middle shaft 22 via a sixth spline 237 and a seventh spline 217, respectively, so that they can mesh with the first larger gear 203 and the first smaller gear 201 of the first dual tandem gear 2, respectively. A right gear 20 is mounted on the middle shaft 22 via an eighth spline 207 to mesh with the ring gear 3.

The front right wheel output shaft 14 is mounted within the sixth bearing bracket 246 and extended into the front left wheel output shaft 19. A clutch gear 16 having a second larger gear 163 and a second smaller gear 161 is mounted on the front right wheel output shaft 14 via roller bearings 167, 169. A fork sleeve 15 is slidably splined to the front right wheel output shaft 14 and provides an inner gear 153 that can mesh with the second smaller gear 161. A tenth gear 17 is fixed to a shaft sleeve 171 that is connected with the shaft 19 by a slidable engaging member 18. The second larger gear 163 meshes with the sixth gear 11.

Recesses 205, 151 and 181 are provided at the outer surface of the first dual tandem gear 2, the fork sleeve 15 and the slidable engaging member 18, respectively, to accommodate forks (not shown) that extend out of the drive housing 24.

The operation of the transmission mechanism 100 of the present invention for driving four wheels of an automotive vehicle will now be described as follows. The driving power is transmitted to the driving power input shaft 1 to drive the first dual tandem gear 2 to rotate. The first dual tandem gear 2 can be regulated to mesh with either the middle gear 21 with the first smaller gear 201 or the left gear 23 with the first larger gear 203 so that the right gear 20 rotates at the different speeds together with the middle shaft 22.

Thus, the ring gear 3 of the differential mechanism 5 engaged to the middle shaft 22 drives the differential mechanism 5 to rotate. This causes the right side bevel gear 6 and the left side bevel gear 4 to rotate. The driving power through the differential mechanism 5 is divided into two parts. The part of the driving power through the right side bevel gear 6 is further divided into two subparts. One subpart is transmitted to the rear left wheel output shaft 12 via the seventh gear 7 and the ninth gear 13. Another subpart is transmitted to the slidable engaging member 18 via the seventh gear 7 and the tenth gear 17, and then transmitted to the front left wheel output shaft 19.

The part of the driving power through the left side bevel gear 4 is transmitted to the core shaft 10 to the sixth gear 11 that drive both the eighth gear 8 and the clutch gear 16 to rotate. The eighth gear 8 then dives the rear right wheel that is connected with the rear right wheel output shafts 9. The front right wheel output shaft 14 that is connected with the front right wheel is driven to rotate via the fork sleeve 15. As a result, the two front output shafts 14, 19 are driven by the fork sleeve 15 and the engaging members 18, respectively, and the two rear output shafts 9, 12 are driven in parallel. With the transmission mechanism 100 of the present invention, the wheels at the same side can be driven at the same time.

When an automotive vehicle equipped the transmission mechanism of the invention moves on weaker roads, and a wheel skids and loses the adhesion to the ground, the output power of the engine will not decrease because the skidding wheel doesn't rotate. Meanwhile, another unskidding wheel at the same side can still be driven because the two wheels are controlled by the same side bevel gear. In addition, because other two wheels at the other side are controlled by another side bevel gear, the vehicle can run as normally. As a result, when two wheels at the same side skid, the vehicle can move via other two unskidding wheels at the same side, and when two wheels at the different sides skid, the automotive vehicle can move via other two unskidding wheels at the different sides.

It is understood that the particular structures embodying the present invention shown and described above are only used for illustrating the present invention, and are not intended to limit the invention. Any modifications or variations to the present invention without departing from the spirit of the invention shall be fallen into the scope of the invention defined by the appended claims.

What is claimed is:

1. A transmission mechanism for driving four wheels of an automotive vehicle comprising:
   a drive housing having a first bearing bracket disposed at a middle portion thereof, a second bearing bracket disposed at the middle portion thereof, a third bearing bracket disposed at a left upper portion thereof, a fourth bearing bracket disposed at a right upper portion thereof, a fifth bearing bracket disposed below the first bearing bracket, and a sixth bearing bracket disposed at a lower portion thereof;
   a differential mechanism including a right side bevel gear, a left side bevel gear, and a ring gear;
   a driving power input shaft mounted within said first bearing bracket;
   a first dual tandem gear slidably mounted on said driving power input shaft;

a core shaft mounted within said second bearing bracket, on which said differential mechanism is mounted;

a sixth gear connected with said core shaft;

a seventh gear connected with said core shaft;

a rear right wheel output shaft mounted within said third bearing bracket;

an eighth gear fixed to said rear right wheel output shaft;

a rear left wheel output shaft mounted within said fourth bearing bracket;

a ninth gear fixed to said rear left wheel output shaft;

a middle shaft mounted within said fifth bearing bracket;

a left gear mounted on said middle shaft close to said fifth bearing bracket;

a right gear mounted on said middle shaft to mesh with said ring gear;

a middle gear mounted on said middle shaft between said left and said right gear;

a front right wheel output shaft mounted within said sixth bearing bracket;

a clutch gear mounted on said front right wheel output shaft;

a tenth gear mounted on said front right wheel output shaft; and a front left wheel output shaft connected with said tenth gear, into which said front right wheel output shaft is extended, wherein when said driving power input shaft is driven, said first dual tandem gear can be regulated to mesh with either said left gear or said middle gear so that the automotive vehicle can obtain different speeds, and wheels at the same side of the automotive vehicle can be driven at the same time.

2. The transmission mechanism of claim 1, wherein said tenth gear is fixed to a shaft sleeve that is mounted on said front right wheel output shaft, and a slidable engaging member is provided to connect said front left wheel output shaft with said shaft sleeve.

3. The transmission mechanism of claim 1, wherein a fork sleeve is slidably mounted on said front right wheel output shaft and provides an inner gear to mesh with said clutch gear.

4. The transmission mechanism of claim 2, wherein a fork sleeve is slidably mounted on said front right wheel output shaft and provides an inner gear to mesh with said clutch gear.

5. The transmission mechanism of claim 1, wherein said ring gear is fixed to a first shaft sleeve extended from a differential case, and said seventh gear is splined to a second shaft sleeve extended from said right side bevel gear.

6. The transmission mechanism of claim 2, wherein said ring gear is fixed to a first shaft sleeve extended from a differential case, and said seventh gear is splined to a second shaft sleeve extended from said right side bevel gear.

7. The transmission mechanism of claim 3, wherein said ring gear is fixed to a first shaft sleeve extended from a differential case, and said seventh gear is splined to a second shaft sleeve extended from said right side bevel gear.

8. The transmission mechanism of claim 4, wherein said ring gear is fixed to a first shaft sleeve extended from a differential case, and said seventh gear is splined to a second shaft sleeve extended from said right side bevel gear.

9. The transmission mechanism of claim 1, wherein said first dual tandem gear is splined to said driving power input shaft.

10. The transmission mechanism of claim 2, wherein said first dual tandem gear is splined to said driving power input shaft.

11. The transmission mechanism of claim 3, wherein said first dual tandem gear is splined to said driving power input shaft.

12. The transmission mechanism of claim 4, wherein said first dual tandem gear is splined to said driving power input shaft.

13. The transmission mechanism of claim 5, wherein said first dual tandem gear is splined to said driving power input shaft.

14. The transmission mechanism of claim 2, wherein each of said first dual tandem gear and said slidable engaging member provides a recess at an outer surface thereof for connecting a fork.

15. The transmission mechanism of claim 4, wherein each of said first dual tandem gear and said slidable engaging member provides a recess at an outer surface thereof for connecting a fork.

16. The transmission mechanism of claim 6, wherein each of said first dual tandem gear and said slidable engaging member provides a recess at an outer surface thereof for connecting a fork.

17. The transmission mechanism of claim 10, wherein each of said first dual tandem gear and said slidable engaging member provides a recess at an outer surface thereof for connecting a fork.

* * * * *